March 5, 1957 W. KOHLHAGEN 2,783,657
CONSTANT TORQUE DRIVE
Filed April 14, 1954 7 Sheets-Sheet 2

Inventor:
Walter Kohlhagen
by: Stevens + [illegible]
Attorneys.

W. KOHLHAGEN 2,783,657

CONSTANT TORQUE DRIVE

Filed April 14, 1954

Fig_11

Fig_12

INVENTOR.
Walter Kohlhagen
BY
Steward & Sprugel
Attorneys.

March 5, 1957 W. KOHLHAGEN 2,783,657
CONSTANT TORQUE DRIVE
Filed April 14, 1954 7 Sheets-Sheet 6

INVENTOR.
Walter Kohlhagen
BY Steward + Sprigel
Attorneys.

March 5, 1957

W. KOHLHAGEN 2,783,657

CONSTANT TORQUE DRIVE

Filed April 14, 1954

INVENTOR.
Walter Kohlhagen
BY
Steward & Jenny
Attorneys.

United States Patent Office 2,783,657
Patented Mar. 5, 1957

2,783,657

CONSTANT TORQUE DRIVE

Walter Kohlhagen, Elgin, Ill., assignor to The E. Ingraham Company, Bristol, Conn., a corporation of Connecticut Application April 14, 1954, Serial No. 423,163

8 Claims. (Cl. 74—472)

This invention relates to power drives in general, and to constant torque drives in particular.

The drive with which the present invention is concerned is of the type which puts out torque that is constant in magnitude despite intermittent power input in the drive. In a previous type of this drive, which is used especially, though not exclusively, in timepieces, a main-type spring acts with one end on an output shaft for imparting torque to it, and is periodically rewound at its other end by an intermittently operating prime mover. While this previous drive is generally satisfactory, it does have certain shortcomings which limit its use. Thus, this previous drive is rather high in cost and presents not only difficulties in its assembly but other structural difficulties as well, primarily due to the provision of a main-type spring. Further, the torque output of this previous drive varies constantly as the mainspring unwinds and is rewound, wherefore the drive is not well suited for purposes in which the constancy of the torque output is of prime import. Also, where a switch or other instrumentality for the control of the prime mover is actuated by a part or parts of the drive, the torque output varies even further since the drive has to furnish the power for the intermittent actuation of the control instrumentality. Moreover, since in this previous drive both ends of the mainspring move, one constantly for the drive of the output shaft and the other intermittently for rewinding the mainspring, any switch arrangement for the intermittent operation of the prime mover is complicated since the operation of the switch necessarily has to be controlled by both movable spring ends.

It is the primary aim and object of the present invention to provide a drive of the constant-torque output and intermittent power input type which has none of the shortcomings of the aforementioned previous drive and is in many respects superior to the same.

Thus, it is an object of the present invention to provide a drive of this type of which the torque output is far more constant in magnitude than that of the aforementioned previous drive of the mainspring type.

It is another object of the present invention to provide a drive of this type which, despite its more constant torque output, is simpler in construction and easier to assemble than the aforementioned previous drive of the mainspring type and, hence, lends itself to efficient mass production at low cost.

It is a further object of the present invention to provide a drive of this type which for its constant torque output relies on the action of a loaded spring which is fixedly anchored at one end and periodically reloaded at its other end to replace therein the energy which is constantly being used up, thereby to achieve the desirable objective of using for the torque production a simple spring without experiencing any of the aforementioned difficulties springing from the use of a main-type spring for the same purpose.

Another object of the present invention is to provide a drive of this type in which the aforementioned periodic reloading of the spring is achieved by a gear train which, when not driven by an intermittently operating prime mover, will transmit the driving force of the spring to the output shaft of the drive, and which, when driven by the prime mover, will reload the spring and, while then not transmitting the driving force of the spring to the output shaft, will exert on the latter a reactive force equal in magnitude and direction to the driving force of the spring, thereby accomplishing with a single gear train not only the drive of the output shaft with the substantially constant force of the spring, or an equivalent force in lieu thereof, at all times, but also reloading of the spring on each intermittent operation of the prime mover.

It is another object of the present invention to provide a drive of this type in which the aforementioned gear train is, in its preferred form, of the epicyclic kind having sun gears carried by the output shaft of the drive and the power shaft of the prime mover, respectively, and a planetary gear or gears carried by an arm with which the non-anchored end of the spring is connected, and at least one of the gears other than that on the output shaft of the drive is locked against rotation opposite to the direction in which it is normally driven on operation of the prime mover, thereby not only permitting back-up of the planetary gear or gears on the other gears in a direction to cause reloading of the spring, when the prime mover, through the gear train, tends to overdrive the output shaft, but also causing locking of the gear train and, hence, preventing motion of the planetary gear or gears opposite to their back-up direction, when the prime mover is inoperative, so that the spring will then, through the planetary gear arm and the locked gear train, act on the output shaft without encountering any friction from the gears.

It is a further object of the present invention to provide a drive of this type in which the aforementioned spring is of the cylindrical helical type, preferably a tension spring, which may be disposed relative to the planetary gear arm so that its effective radius arm will vary in such wise that the torque in the output shaft of the drive will remain substantially constant at all times despite the periodic run-down and reloading of the spring and even if one of the operating parts of the drive is to furnish the power to actuate a switch or other instrumentality for the control of the prime mover.

Another object of the present invention is to provide a drive of this type in which the aforementioned epicyclic gear train is of the reduction type, so as more gradually, rather than too suddenly, to reverse the rotation of the planetary gear arm and reload the spring on intermittent operation of the prime mover and thus keep variations in the torque output of the drive due to inertia forces at a negligible minimum, and also permit the use of a relatively small and inexpensive prime mover which may be of lower torque output than that of the drive.

It is a further object of the present invention to provide a drive of this type in which the aforementioned planetary gear on the powershaft of the prime mover is the one which is locked against rotation opposite to the direction in which it is normally driven on operation of the prime mover, thereby permitting the planetary gear in mesh with the aforesaid locked gear to roll on the latter when the planetary gear arm is under the sole driving force of the spring, and thus eliminating any drag of the prime mover which would have an adverse effect on the constancy of the torque output of the drive.

Another object of the present invention is to provide a drive of this type in which the gears of the aforementioned epicyclic train are, on each spring drive of the planetary gear arm, effectively locked with each other by means of suitable reduction gearing that is interposed between the prime mover and the nearest sun gear in the over-all gear train, thereby not only dispensing with pawls or other devices for locking the gears of the epicyclic train with each other and, accordingly, relieving the prime mover of the extra load constituted by mechanical and friction losses of these pawls or other locking devices, but also enhancing the aforementioned advantages springing from the reduction characteristic of the epicyclic gear train.

A further object of the present invention is to provide a drive of this type of which the aforementioned epicyclic gear train is of the reduction type, and the gears thereof are, on each spring drive of the planetary gear arm, effectively locked with each other in such manner that the planetary gears will roll on the sun gears rather than drag the prime mover, as aforementioned, thereby obtaining, by virtue of the reduction character of the epicyclic gear train, a torque output which is greater than the product of the spring force and its effective lever arm on the torque output shaft.

It is another object of the present invention to provide a drive of this type in which the aforementioned sun gear on the torque output shaft is not fixedly mounted on the latter but is operatively connected therewith by a slip coupling, thereby rendering the drive suited especially, though not exclusively, for timepieces in general and clocks in particular, in which the aforesaid output shaft becomes the minute arbor and the aforesaid coupled gear drives the escapement, so that the minute arbor may be set without disturbing the drive of the escapement with substantially full torque.

It is a further object of the present invention to provide a drive of this type of which the output shaft is journalled in spaced plates, and all the parts of the drive, except perhaps the prime mover, may be located between the plates, by mounting on the output shaft for free rotation thereon not only the planetary gear arm but also the sun gear which is driven by the prime mover either directly or through intermediation of reduction gearing.

Further objects and advantages will appear to those skilled in the art from the following, considered in conjunction with the accompanying drawings.

In the accompanying drawings, in which certain modes of carrying out the present invention are shown for illustrative purposes.

Referring to the drawings, and more particularly to Figs. 1 to 6 thereof, the reference numeral 20 designates a constant torque drive which comprises an output shaft 22, a gear train 24 and a prime mover 26, all of which are carried by a frame 28. The frame 28 has opposite end plates 30 and 32 which are held in spaced parallel relation by pillars 34.

The output shaft 22 is suitably journalled in a bearing 36 on the end plate 30 (Fig. 2), and the prime mover 26 is, in the present instance, an electric motor which is suitably mounted at 38 on the other end plate 32. The motor 26 is provided with suitable terminals 40 and 42 for connection with leads 44 and 46, respectively. For a reason which will appear obvious hereinafter, the motor 26 is so mounted that its shaft 48 extends coaxially of the output shaft 22.

Figure 1:
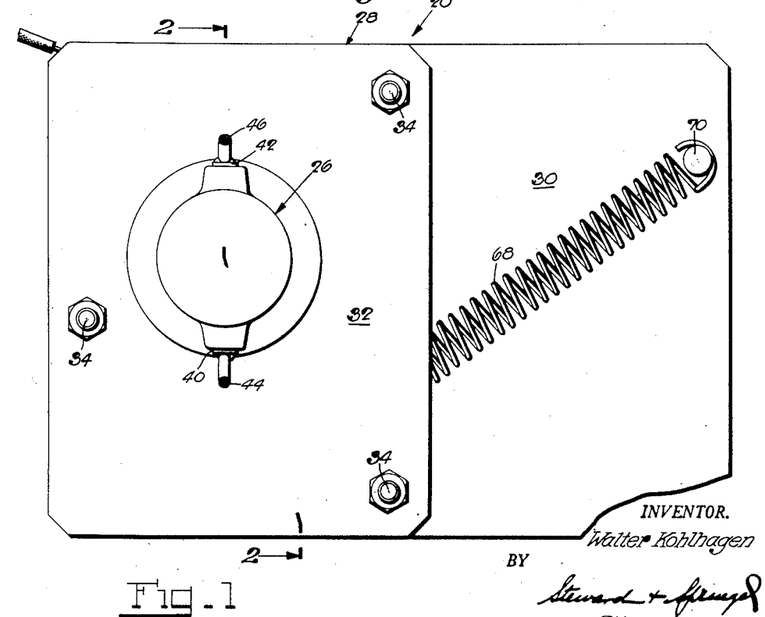
Fig. 1 is an elevational view of a constant torque drive embodying the present invention.
Figure 2:
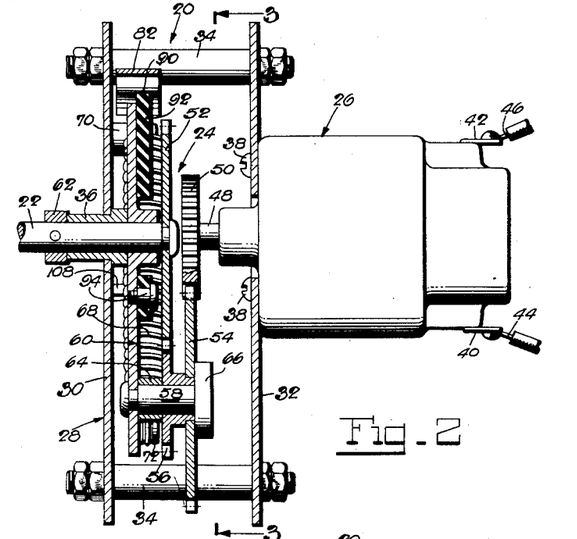
Fig. 2 is a section through the same drive as taken on the line 2—2 of Fig. 1.

The gear train 24 is, in the present instance, of the epicyclic type having sun gears 50 and 52 and planetary gearing, in this instance the planetary gears 54 and 56. The sun gears 50 and 52 are carried by the axially aligned motor and output shafts 48 and 22, respectively, while the planetary gears 54 and 56 are turnable in unison on a stud 58 on a carrier or arm 60 which in this instance is turnable coaxially of the output shaft 22 by being journalled thereon. As shown in Fig. 2, the arm 60 on the output shaft 22 is in this instance interposed between the sun gear 52 and the bearing 36, and the sun gear 52 together with a collar 62 on the output shaft hold the latter against any appreciable axial motion in its bearing 36. A spacer sleeve 64 on the stud 58 and a head 66 on the latter serve to hold the planetary gears 54 and 56 against axial movement from meshing relation with the respective sun gears 50 and 52.

A spring 68 is provided to urge the arm 60 in a certain direction. In the present instance, the spring 68 is a cylindrical helical tension spring which is anchored with its ends on studs 70 and 72 on the end plate 30 and the arm 60, respectively, and this spring normally urges the arm 60 in a counterclockwise direction as viewed in Figs. 3 to 6.

For reasons explained hereinafter, there is provided a pawl connection between the arm 60 and the planetary gears 54 and 56. In this instance, a pawl 74 is pivotally mounted at 76 on the planetary gear 54 and normally urged by a spring 78 on the latter into operative engagement with the disc-shaped head 66 on the stud 58 to lock the planetary gears 54 and 56 against counterclockwise rotation as viewed in Figs. 3 to 6, but permit their rotation in the opposite direction.

The instant constant torque drive 20 further provides a control for the prime mover 26, in this instance a switch 80 for the exemplary electric motor. The electric motor 26, is in this instance, of the D. C. type, and one of the contacts of the switch 80 may conveniently be grounded. In the example shown, the grounded contact of the switch 80 is formed by the metallic arm 60 which through the output shaft 22 and bearing 36 is grounded to the frame 28, while the other contact of the switch is formed by a conductive spring blade 82 which is insulatingly mounted at 84 on a bracket 86 on the end plate 30. The contact blade 82 (Fig. 3) may through the previously mentioned lead 44 be connected with the motor 26 (Fig. 2), in which case the other lead 46 would be connected with the positive side of any suitable D. C. current source.

The contact blade 82 is normally urged into contact with the adjacent curved edge 88 of the arm 60, and is at certain times disengaged therefrom by an insulating track 90 which is formed by a curved edge of an insulating plate 92 on the arm 60. For a reason explained hereinafter, the insulating plate 92 is in this instance movable on the arm 60 by being pivotally mounted thereon as at 94. More particularly, the insulating plate 92 has a predetermined range of motion relative to the arm 60 as defined by a pin and slot connection 96, 98 between them. In this instance, the pin 96 is carried by the arm 60, while the slot 98 is formed in the insulating plate 92 concentrically with respect to its pivot support 94.

Following is a description of the operation of the instant constant torque drive. Assuming that the output shaft is under a load and the arm 60 has, under the urgency of the spring 68, just reached the position shown in Fig. 3 in which the contact blade 82 engages the adjacent edge 88 of the arm 60, the circuit of the motor 26 will be closed, as previously explained, and the gear 50 on the motor shaft 48 will be driven in the direction of the arrow 100. Accordingly, the planetary gears 54 and 56 will be driven by the motor gear 50 in the direction of the arrow 102 in Fig. 3. The operating speed of the motor 26 and its torque output are so high that the planetary gears 54 and 56 thus driven will back up on the sun gear 52 on the output shaft 22 and, in consequence, turn the arm 60 clockwise as viewed in Fig. 3 toward and into the position shown in Fig. 5. While the arm 60 is thus turned clockwise toward and into the position in Fig. 5, the output shaft 22 is constantly driven counterclockwise at substantially constant torque which is equal to the product of the force of the spring 68 and its effective radius arm on the output shaft. This is due to the fact that the spring 68 will transmit its force to the output shaft 22 through the arm 60 and the meshing gears 56 and 52 even while the gear 56 backs up on the gear 52. On the other hand, the back-up of the planetary gears 54, 56 on the sun gear 52 is due to the overdrive of the former by the motor at a torque in excess of the described constant torque in the output shaft 22 under the control of the spring 68.

Figure 3:
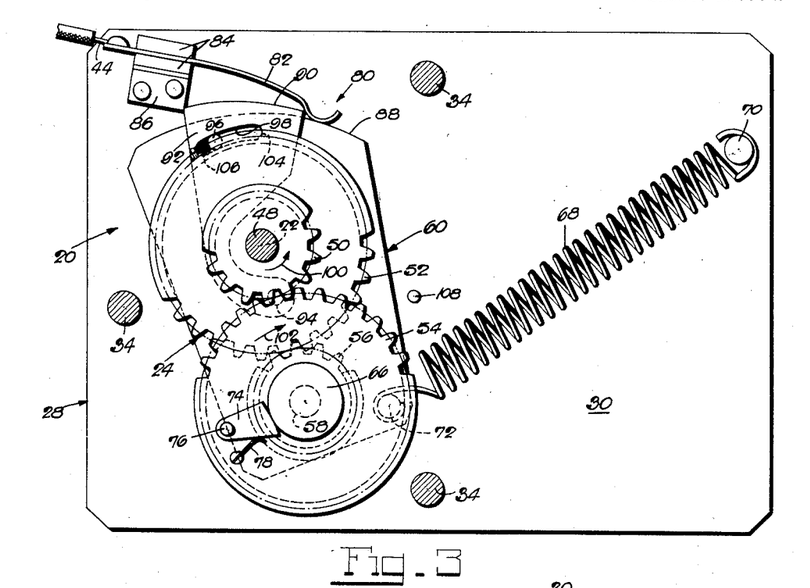
Fig. 3 is a section through the same drive as taken on the line 3—3 of Fig. 2.
Figure 4:
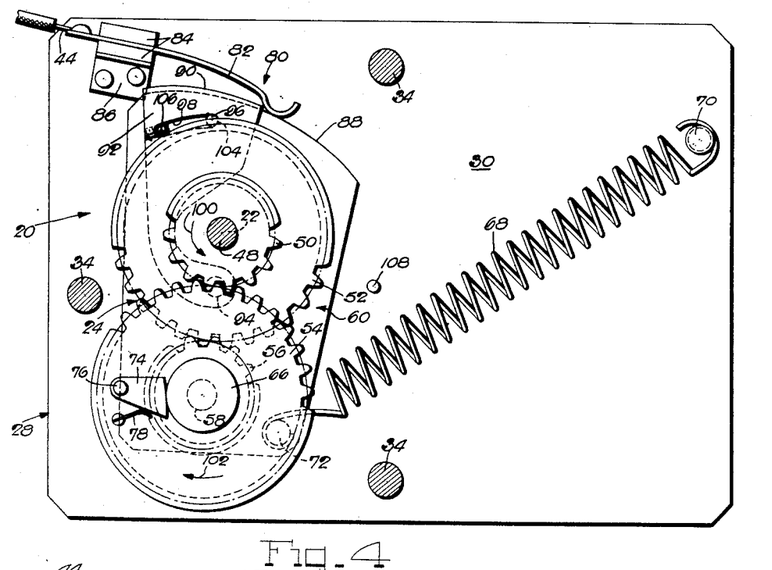
Figs. 4, 5 and 6 are sections similar to Fig. 3, but showing certain parts of the drive in different operating positions.

While the arm 60 is thus turned clockwise from the position shown in Fig. 3 by the reaction between the motor-driven planetary gears 54, 56 and the sun gear 52 on the output shaft 22, the spring 68 will be reloaded, in this instance retensioned, while the output shaft 22 is driven at a substantially constant torque which, as previously mentioned, is equal to the product of the force of the spring 68 and its effective radius arm on the output shaft. During this clockwise rotation of the arm 60 from the position in Fig. 3, the pivoted insulating plate 92 on the arm 60 is prevented from following the latter by the contact blade 82 which engages the arm 60 and, hence, holds the circuit of the motor 26 closed until the arm reaches the position shown in Fig. 4. At that time, the pin 96 on the arm 60 has reached the end 104 of the slot 98 in the insulating plate 92 and carries the latter along, forcing thereby the contact blade 82 out of engagement with the arm 60 and onto the track 90 on the insulating plate 92 (Fig. 5) and, in consequence, opening the circuit of the motor 26.

Figure 5:
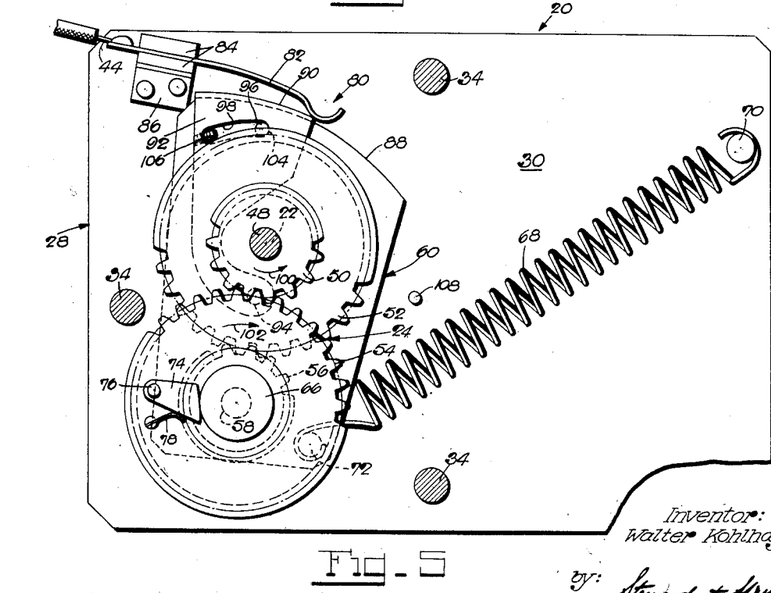

The motor is now stopped, and the reloaded spring 68 will immediately exert itself in turning the arm 60 in reverse or counterclockwise direction from the position in Fig. 5, hereafter referred to as "wound-up" position, toward and into the position in Fig. 3, hereafter referred to as "run-down" position. The spring-urged pawl 74 then comes into play and locks the planetary gears 54 and 56 against counterclockwise rotation immediately on the spring-drive of the arm 60 from its wound-up position (Fig. 5). Therefore, the planetary gears 54 and 56, being thus locked against rotation in the direction in which they could roll on the sun gear 52, are positively locked with the latter, and the gears thus locked to each other serve to lock the arm 60 to the output shaft 22 as effectively as if the former were keyed to the latter. Hence, the output shaft 22 will, immediately on assumption of the drive of the arm 60 by the reloaded spring 68, continue to be driven, without interruption, in the same direction as during the preceding motor drive of the arm, and also at substantially the same constant torque as before, namely that of the product of the force of the spring 68 and its effective radius arm on the output shaft 22, as will be readily understood. Of course, the drive of the output shaft 22 in the same direction and at substantially the same torque will prevail during the entire spring-drive of the arm 60 into its run-down position (Fig. 3).

During the greater part of the spring-drive of the arm 60 into its run-down position the force with which the contact blade 82 engages the track 90 on the insulating plate 92 will prevent the latter from following the arm 60. It is only when the pin 96 on the arm engages, toward the end of the spring-drive of the latter, a set screw 106 in the slot 98 in the insulating plate 92 (Fig. 6) that the latter will travel with the arm and remove its track 90 from the contact blade 82, permitting thereby reengagement of the blade 82 with the arm 60 (Fig. 3) and, hence, causing reclosing of the circuit of the motor 26. The arm 60 will thereupon be power-driven in the opposite direction toward and into its wound-up position, as previously described, for reloading the partially unloaded spring 68 without, however, interrupting the drive of the output shaft at the aforementioned substantially constant torque.

It follows from the preceding that as long as the motor 26 is connected with an electric power source the output shaft 22 will constantly be driven, in the same direction and at substantially constant torque which is equal to the product of the force of the spring 68 and its effective radius arm on the output shaft, despite the described alternating spring-drive and motor-drive of the arm 60. When the motor 26 is disconnected from its power source in any suitable manner, the spring 68 will be permitted to drive the arm 60 into a stop position in which the same bears in this instance against a stop pin 108 on the end plate 30.

The instant epicyclic train 24, being in the example shown of the reduction type, will permit the use of a prime mover 26 of less torque output than that required of the output shaft 22. This is of decided advantage for those applications of the instant constant torque drive where economy in power input, low over-all cost of the drive and small over-all bulk of the latter, are of prime import. The reduction character of the epicyclic gear train 24 is further advantageous in that the same will more gradually, rather than too suddenly, reverse the arm 60 and reload the partially unloaded spring 68 on intermittent operation of the motor 26, and thus keep variations in the torque output of the drive due to inertia forces at a minimum.

While in the exemplary constant torque drive 20 of Figs. 1 to 6 the planetary gear arm 60 is in true epicyclic train fashion turnable about the common axis of the sun gears 50 and 52, this arm may be turnable about a different axis as long as the planetary gears 54 and 56 will remain in mesh with their respective sun gears 50 and 52 within the relatively short operating range of the arm between its wound-up and run-down positions (Figs. 5 and 3). Further, the spring which acts on the arm 60 and determines the substantially constant torque in the output shaft 22, need not be a tension spring as shown, but may be a compression-type spring arranged on the opposite side of the arm in a manner which is so obvious as to require no further explanation.

While the torque in the output shaft 22 of the instant basic drive 20 is constant for most practical intents and purposes, it is recognized that this torque varies somewhat due to several factors. Thus, the torque in the output shaft 22 will, during each motor-drive and each spring-drive of the arm 60, vary somewhat due to the gradually increasing and gradually decreasing force, respectively, of the spring 68 and the constantly changing effective length of its radius arm on the output shaft 22. Further, some small part of the force of the spring 68 will be required to overcome the initially static and subsequent running friction between the pawl 74 and the head 66 on the planetary gear stud 58 when the arm 60 is motor-driven into its wound-up position, with the result that the torque in the output shaft 22 will then be somewhat less than during the spring-drive of the arm. Similarly, the friction encountered by the contact blade 82 on the arm 60 during the motor-drive of the latter into its wound-up position may somewhat reduce the torque in the output shaft 22, although the increased friction between the pivot pin 94 and the insulating plate 92 by the pressure of the contact blade 82 against the latter during the spring-drive of the arm into its run-down position may well equal, or substantially equal, the friction between the arm and the contact blade during the motor-drive of the arm into its wound-up position, in which case the constancy of the torque in the output shaft will not be affected on either drive of the arm. Also, since the planetary gears 54 and 56 are locked to the sun gear 52 on the output shaft 22 for the spring-drive of the arm 60 into its run-down position, it follows that the planetary gear 54 will also be locked with the sun gear 50 on the motor shaft 48, and the spring 68 will have to drag the motor shaft in order to drive the arm 60, with the result that the torque in the output shaft will, on the spring-drive of the arm, be reduced to an extent depending on the spring force required to drag the motor shaft. Moreover, while the arm 60 is, during its spring-drive into run-down position, locked to the output shaft 22 and, hence, encounters no friction on the latter, the same does encounter friction thereon during its following motor-drive into wound-up position, and this friction somewhat reduces the torque in the output shaft. Under normal mounting conditions of the arm 60 on the output shaft 22, this friction is so negligible that it will hardly affect the constancy of the torque. However, if the arm 60 should be abnormally tight or become accidentally bound on the output shaft 22 or on any other shaft on which it may be journalled, this latter friction, by having a negative or reducing effect on the torque of the output shaft, is even advantageous when the drive is applied for a purpose where a substantially increased torque output by the shaft 22 might well be harmful, as in driving a clock, for instance.

While the aforementioned factors tend more or less to have a varying effect on the constancy of the torque in the output shaft 22, this varying effect on the torque constancy is, as already mentioned, so slight as to be negligible for many practical applications of the instant basic drive, as in constant-torque power tools, for instance. Moreover, these factors have been explained above in order fully to appreciate other forms of the constant torque drive, to be described, which practically eliminate any or all of these factors that may tend to affect the constancy of the torque more than is permissible in applications of the drive in which the constancy of the torque is the main objective.

Figure 6:
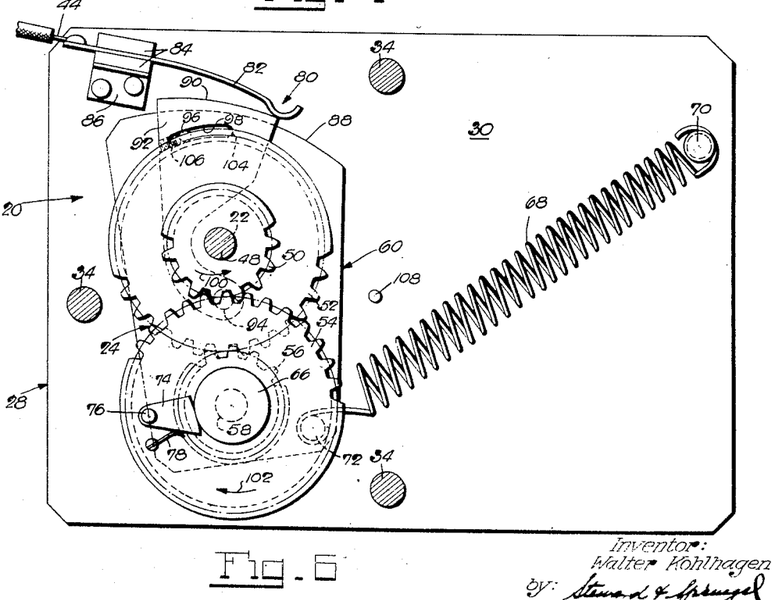
Figure 6A:
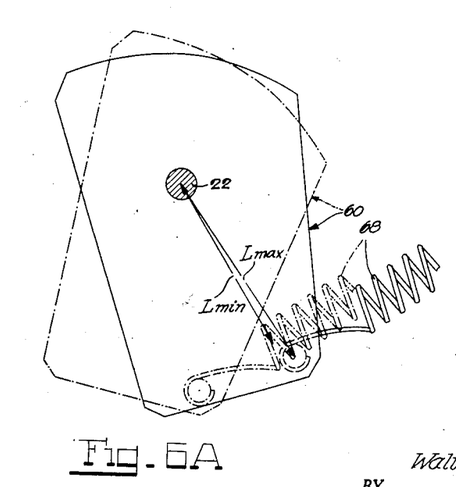
Fig. 6A is a diagrammatic view of certain prominent parts of the drive and their coordination in different operating positions.

Reference is now had to Fig. 6A which diagrammatically shows the arm 60 and spring 68 so coordinated that the torque-varying effect of the spring due to its changing force on partial unloading and reloading is so minimized as to be eliminated to all practical intents and purposes. The arm 60 is shown in dot-and-dash lines in its wound-up position, and in full lines in its run-down position. The spring 68 is so arranged that the same has a maximum lever arm Lmax on the output shaft 22 when the arm 60 is in its run-down position, and has a minimum lever arm Lmin on the output shaft 22 when the arm 60 is in its wound-up position. Thus, the coordination of the arm 60 and the spring 68 may well be such that the product of the force of the spring and its effective radius arm on the output shaft is the same in any position of the arm between and including its wound-up and run-down positions, resulting in constant torque in the output shaft 22 despite the inevitable variations in the spring force. The coordination of the arm 60 and spring 68 may be carried even further in order to obtain substantially the same output torque, i. e. the product of the force of the spring and its effective radius arm on the output shaft, throughout the operating range of the arm and despite the added load imposed on the spring of operating a switch or other control instrumentality for the prime mover from the arm within a part of its operating range.

Figure 7:
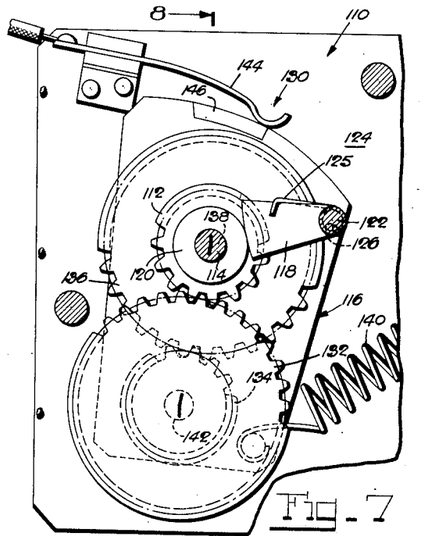
Fig. 7 is a fragmentary section through a constant torque drive embodying the present invention in a modified manner.
Figure 8:
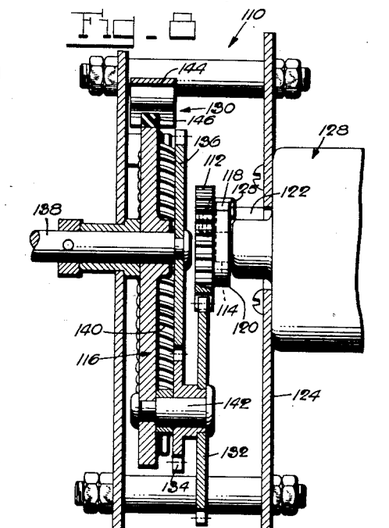
Fig. 8 is a section taken subsatntially on the line 8—8 of Fig. 7.

Reference is now had to Figs. 7 and 8 which show a modified constant torque drive 110 that is in all essential respects like the described basic drive 20, except that the sun gear 112 on the motor shaft 114, sometimes referred to hereinafter as "motor pinion," is locked against rotation during each spring-drive of the arm 116. To this end, there is provided a friction pawl 118 which in this instance cooperates with a disc 120 on the motor pinion 112. The pawl 118 is suitably pivoted on a post 122 on the end plate 124, and is normally urged into engagement with the disc 120 by a torsion spring 125 which may be anchored at 126 on the post 122. The pawl 118 is so arranged that it will, during the counter-clockwise spring-drive of the arm 116 into its run-down position, lock the motor pinion 112 against clockwise rotation, but will permit its opposite drive by the motor 128 for each drive of the arm 116 into its wound-up position (Fig. 7).

Assuming that the arm 116 has just reached its run-down position, the switch 130 will reenergize the motor 128, whereupon the motor pinion 112 is driven counter-clockwise (Fig. 7) and the planetary gears 132 and 134 will, in consequence, back up on the other sun gear 136 on the output shaft 138 until the arm 116 reaches its wound-up position, at which time the switch 130 will be actuated to open the circuit of the motor 128. As in the previously described drive 20, the planetary gears 132 and 134 will, during the motor-drive of the arm 116 into its wound-up position, react with the sun gear 136 on the output shaft 138 and impart to the latter a torque which is equal to the product of the force of the spring 140 and its effective radius arm on the output shaft.

Immediately on stoppage of the motor 128 in the wound-up position of the arm 116, the spring 140 will exert itself to return the arm to its run-down position. Were it not for the action of the pawl 118, the motor pinion 112 would then simply be driven, clockwise as viewed in Fig. 7, by the planetary gears 132 and 134 in such runaway fashion as would be permitted by the motor 128 and as would permit the quickest possible return of the arm 116 into its rundown position, with the obvious result that the loaded output shaft 138 would not be driven or be driven only at a torque much reduced from its required constant torque. However, the pawl 118 will come into action immediately on the assumption of the drive of the arm 116 by the spring 140 and lock the motor pinion 112 against run-away in clockwise direction (Fig. 7) so that the latter will not at all turn during the spring-drive of the arm, wherefore the planetary gears 132 and 134 are then effectively locked to the sun gear 136 on the output shaft 138 and continue to drive the latter in the same counterclockwise direction until the arm reaches its run-down position. While it is true that the planetary gears 132 and 134 are locked to the sun gear 136 on the output shaft 138 during the entire spring-drive of the arm 116, it will be understood that the planetary gears 132 and 134, and more particularly the gear 132 will during that time roll on the locked motor gear 112, causing thereby a slight angular relative shift between the meshing gears 134 and 136 during the entire spring-drive of the arm. Thus, while in the described basic drive 20 the planetary gears were locked during the spring-drive of the arm and the motor shaft had to be dragged along in consequence, the motor pinion 112 in the instant modified drive 110 is, during the spring-drive of the arm 116, locked and the planetary gears roll freely on the motor pinion rather than drag the same and the motor shaft along. Hence, the great advantage of the instant modified drive lies in the fact that the motor is not dragged during each spring-drive of the arm 116, and the torque in the output shaft 138 is in consequence more nearly constant on either drive of the arm.

The slight rolling of the planetary gears 132 and 134 on the locked motor pinion 112 during each spring-drive of the arm 116 has this further effect that the reduction character of the epicyclic train superimposes upon the normal torque in the output shaft from the force of the spring 140 additional slight torque so that the over-all torque in the output shaft is in reality somewhat greater than the product of the force of the spring and its effective radius arm on the output shaft. On the other hand, it may well be that the additional torque afforded by the reduction character of the epicyclic train is substantially used up in overcoming the friction between the planetary gear stud 142 and the planetary gears 132 and 134 thereon when the latter roll on the locked motor pinion 112 during each spring-drive of the arm 116, in which case the torque in the output shaft 138 will more nearly be constant on either drive of the arm 116.

The switch 130 is in the instant modified drive 110 shown, for simplicity's sake, as comprising a contact blade 144 and the grounded arm 116 having an insulating insert 146. The arm 116, being shown in its wound-up position in Fig. 7, the contact blade 144 naturally rests on the insulating insert 146 in the arm to open the circuit of the motor 128. On the following spring-drive of the arm 116, the contact blade 144 will soon reengage the arm and reclose the circuit of the motor for the return of the arm from its run-down position into its wound-up position. Accordingly, the operating range of the arm 116 is very narrow, but if a wider operating range is desired it is merely necessary to substitute the pivoted insulating plate 92 of the described basic drive 20 for the insulating insert 146 in the present arm 116.

The instant modified drive 110 has the further advantage that the friction between the pawl 118 and the disc 120 on the motor pinion 112 during the motor drive of the arm 116 will not in any way reduce the torque in the output shaft 138, but will merely constitute an added load for the motor 128.

Figure 9:
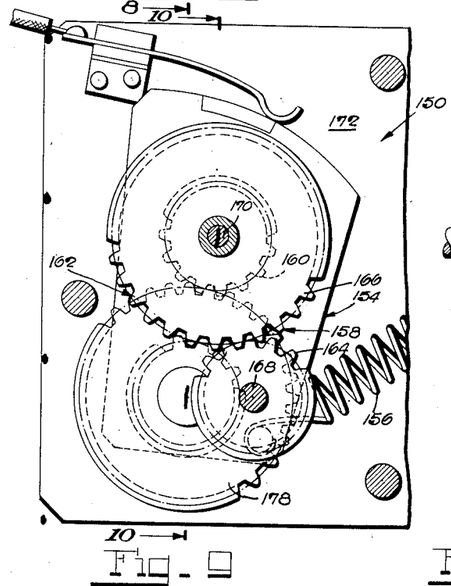
Fig. 9 is a fragmentary section through a constant torque drive embodying the present invention in another modified manner.
Figure 10:
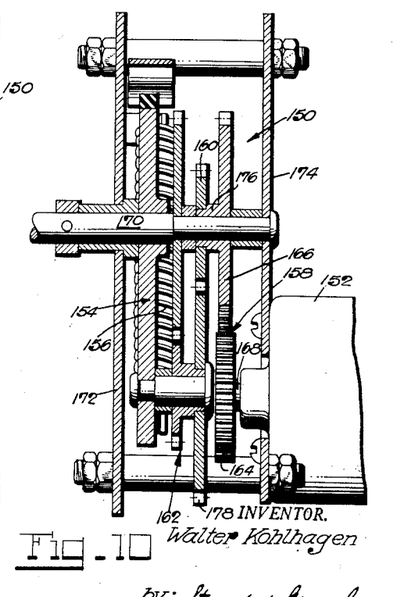
Fig. 10 is a section taken substantially on the line 10—10 of Fig. 9.

Reference is now had to Figs. 9 and 10 which show another modified constant torque drive 150. This drive, like the drive 110 of Figs. 7 and 8, will not drag the prime mover or motor 152 during the drive of the arm 154 by the spring 156. This is achieved in the present drive, however, by reduction gearing 158 which is interposed between the motor 152 and the nearest sun gear 160 of the epicyclic train 162. The reduction gearing 158 comprises, in this instance, two gears 164 and 166 of which the former is carried by the motor shaft 168 and the latter is journalled on the output shaft 170 which, in the present instance, extends between and is journalled in the pillar-spaced end plates 172 and 174. The sun gear 160 is mounted on the hub 176 of the gear 166 so as to turn in unison therewith.

The ratio of the reduction gears 164 and 166 is such that the force exerted by the planetary gear 178 against the sun gear 160 during the spring-drive of the arm 154 is insufficient to overcome the friction in the motor 152 and whatever additional friction is encountered by the reduction gears 164 and 166, so that the sun gear 160 will then be locked against rotation as effectively as the motor pinion 112 is locked by the pawl 118 in the described modified drive 110 of Figs. 7 and 8.

The present modified drive 150, by providing the reduction gearing 158 in lieu of the pawl 118 in the modified drive 110 of Figs. 7 and 8, secures the further advantage that the present motor is not additionally burdened by friction between a motor pinion and a pawl during the motor-drive of the arm. In fact, the additional speed reduction afforded by the gears 164 and 166 permits the use of a motor of even lower torque output, and thus aids in the achievement of a constant torque drive of minimum power input, low over-all cost and small over-all bulk.

Figure 11:
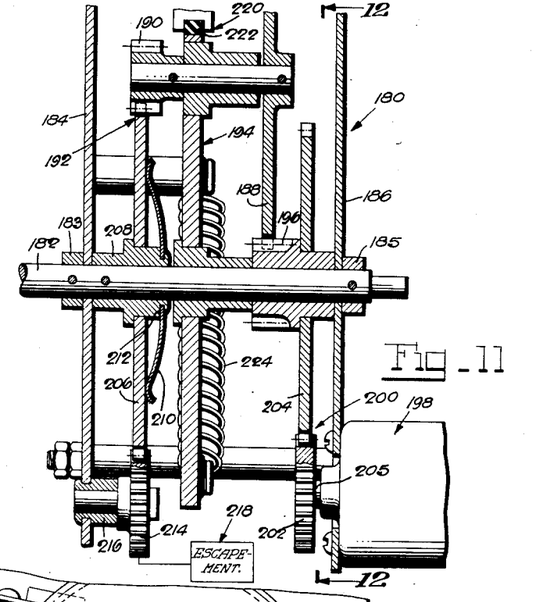
Fig. 11 is a fragmentary section through a constant torque drive embodying the present invention in a further modified manner.
Figure 12:
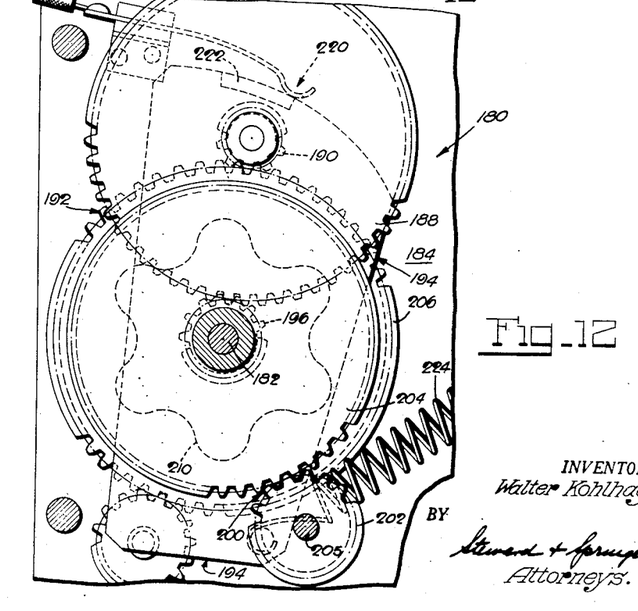
Fig. 12 is a fragmentary section taken substantially on the line 12—12 of Fig. 11.

Reference is now had to Figs. 11 and 12 which show a constant torque drive 180 that is suited especially for a timing device, such as a clock, for instance. The output shaft 182 is in this instance a timing arbor and may be the minute arbor of a clock. The arbor 182 extends between and is journalled in pillar-spaced end plates 184 and 186, and may be held against axial motion by collars 183 and 185. The planetary gears 188 and 190 of the epicyclic grain 192 are rotatably mounted on the arm 194 which is journalled on the arbor 182. The sun gear 196, which is also journalled on the arbor 182, is drivingly connected with the motor 198 by reduction gearing 200, comprising in this instance the gears 202 and 204 of which the former is mounted on the motor shaft 205 and the latter is mounted on the sun gear 196 for unitary rotation therewith. The other sun gear 206 is, in contrast to the corresponding sun gears of the preceding described forms of the drive, journalled on a fixed sleeve 208 on the arbor 182 and is coupled thereto by a spring disc 210 which is anchored at 212 to the sleeve 208 and bears against the gear 206.

Meshing with the sun gear 206 is another gear 214 which is journalled in a suitable bearing 216 on the end plate 184, and is drivingly connected with any conventional escapement 218 indicated for the sake of simplicity by a labeled rectangle in Fig. 11. The escapement 218 performs its customary function of controlling the rate at which the arbor 182 is driven with sufficient accuracy for time-keeping purposes.

The operation of the instant drive 180 is exactly like that of the drive 150 of Figs. 9 and 10, with the following exceptions. As already pointed out above, the uniform rate at which the arbor 182 is driven is under the control of the escapement 218. Further, the instant drive 180 imparts its constant torque to the arbor 182 by the friction or slip coupling 210, and this is a great advantage inasmuch as the arbor 182 may be set without interrupting or damaging the constant torque drive with its escapement in any way.

Here again there is shown, for simplicity's sake, a simple switch arrangement 220 for the control of the motor 198, this switch arrangement resulting in a rather narrow range of motion of the arm 194 between its wound-up and run-down positions. However, a much wider range of motion of the arm 194 may readily be obtained by substituting for the insulating insert 222 in the arm the pivoted insulating plate 92 of the basic drive of Figs. 1 to 6, for instance.

The instant drive 180 is further well suited for timing devices in general and clocks in particular, because all the operating parts of the drive, save the motor, are mounted in typical movement fashion between the end plates 184 and 186, and it is even conceivable to mount the motor between the end plates also. The instant drive for a timing device or clock, for instance, is especially suited for operation with D. C. current, such as low-voltage battery current, for instance. The current consumption may be kept very low by providing for a substantial range of motion of the arm 194 within which the torque in the arbor 182 may be kept quite constant by proper coordination of the arm 194 and its spring 224 as previously explained in connection with Fig. 6A.

It is also fully within the purview of the present invention to arrange the spring 224 and arm 194 in the instant drive 180 in conformity with the teaching of Fig. 6A, namely so that the axis of the spring 224 and a straight line passing through its anchored end on the arm 194 and through the rotary axis of the latter form substantially a right angle when the arm 194 is in its run-down position.

While any of the previously described forms of the constant torque drive may be used for a timing device by simply driving an escapement from the sun gear on the output shaft of the drive, the instant form 180 of the drive is by far the best for a timing device in general and a clock in particular, because the slip coupling 210 between the sun gear 206 and the arbor 182 permits adjustment of the latter for setting a minute hand thereon, and through the usual further reduction gearing also an hour hand. Further, while the exemplary provision of the reduction gearing 200 in the instant form 180 of the drive is especially advantageous in a timing device from the standpoint of over-all structural simplicity and ease of assembly and, hence, low cost of the drive, rugged and durable construction and small bulk of the same, the use of a small and inexpensive motor of low torque output and very low current consumption by the same, and last but not least most nearly perfect constancy of the torque in the arbor 182 due to the elimination of most of the hereinbefore explained factors that tend to vary the torque in the arbor, it is fully within the purview of this invention to eliminate in this drive the reduction gearing 200 and use in lieu thereof either one of the locking pawls 74 or 118 of the forms of the drive shown in Figs. 1 to 6 or in Figs. 7 and 8.

Figure 13:
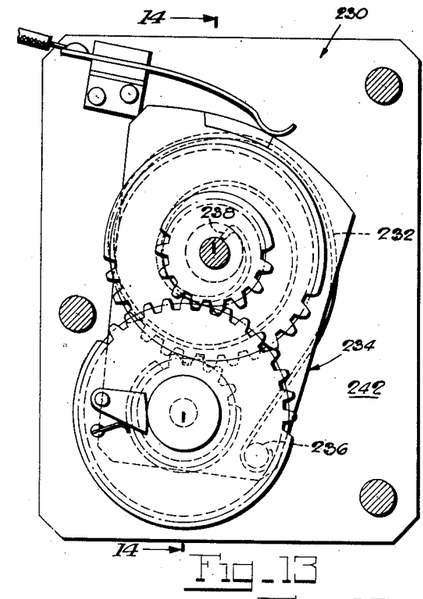
Fig. 13 is a section through a constant torque drive embodying the present invention in another modified manner.
Figure 14:
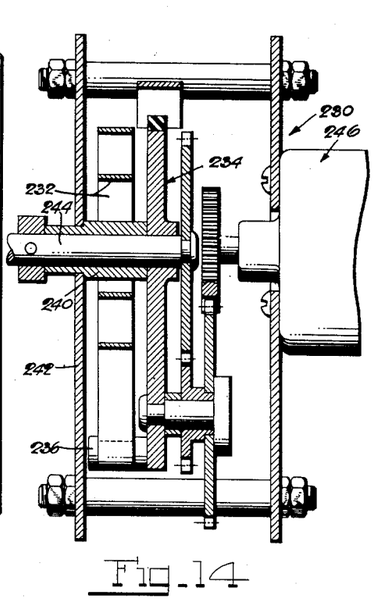
Fig. 14 is a section taken substantially on the line 14—14 of Fig. 13.

Reference is now had to Figs. 13 and 14 which show a further modified constant torque drive 230. This drive may in all essential respects be like that of Figs. 1 to 6, except that the present drive uses, in lieu of a helical tension spring, a spiral coiled spring 232 which, for the sake of simplicity, is shown with fewer turns than it would ordinarily have for achieving the objective of torque constancy within the permissible operating range of the arm 234. The spring 232 is, in this instance, anchored with one end on a stud 236 on the arm 234 and with its other end, at 238, in a bearing 240 on the end plate 242 in which the output shaft 244 is journalled.

The instant drive 230, by using the spiral coiled spring 232 for each spring-drive of the arm 234, indicates a possible operating range of the arm far in excess of those of the previously described forms of the drive. Thus, the instant spring, when properly selected as to its characteristics, will permit an operating range of the arm 234 of one or more full revolutions. Of course, in that case the control for the prime mover or motor 246 would have to be arranged to suit this increased operating range of the arm.

Figure 15:
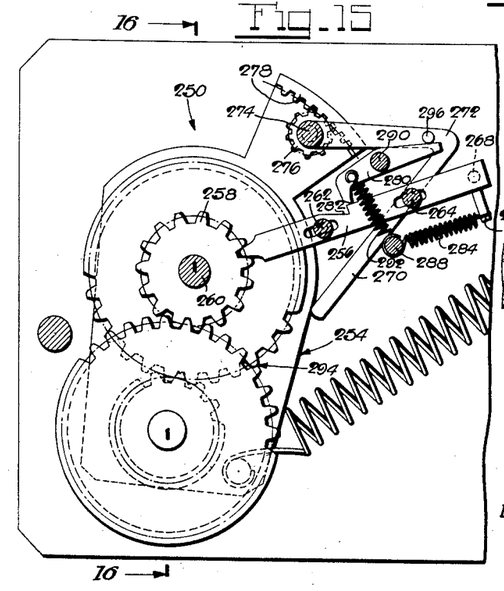
Fig. 15 is a fragmentary section through a constant torque drive embodying the present invention in another modified manner.
Figure 16:
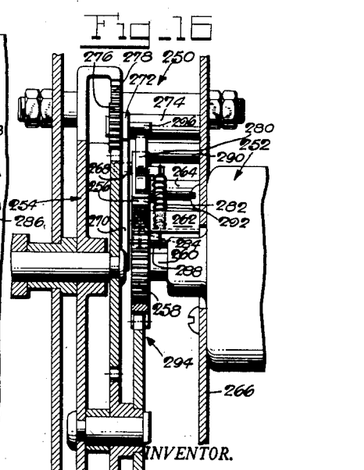
Fig. 16 is a fragmentary section taken substantially on the line 16—16 of Fig. 15.

Reference is now had to Figs. 15 and 16 which show another modified constant torque drive 250 that differs from all previously described forms of the drive by having, in lieu of a switch or other controller for the prime mover or motor 252, provisions for jamming the latter during each spring-drive of the arm 254. These provisions comprise a latch bar 256 which, in the present instance, is adapted to lock with the teeth of the sun gear 258 on the motor shaft 260 and release this sun gear on each spring-drive and each motor-drive of the arm 254 into its run-down and wound-up positions, respectively. The latch bar 256, which may be guided for longitudinal movement radially of the motor shaft 260 on spaced posts 262 and 264 on the end plate 266, has a lateral pin 268 which on movement of the arm 254 into its run-down position is adapted to be engaged by an arm 270 of a lever 272 for retracting the latch bar from interlock with the teeth of the motor pinion 258 and permitting the motor to drive the arm 254 into its wound-up position. To this end, the lever 272, which is pivotally mounted on a post 274 on the end plate 266, carries coaxially of its pivot a pinion 276 which is in mesh with a gear segment 278 on the arm 254. Hence, it will be observed from Fig. 15 that the lever 272 will, on the counterclockwise spring-drive of the arm 254, be also turned counterclockwise through intermediation of the gear segment 278 and pinion 276, until the arm 270 of the lever 272 engages the pin 268 on the latch lever 256 and retracts the latter from interlock with the motor pinion 258 when the arm 254 reaches its run-down position.

On the aforementioned retraction of the latch bar 256 from the interlock with the motor pinion 258 a spring-urged pawl 280 will lock with a notch 282 in the latch bar and prevent return of the latter into interlock with the motor pinion 258 under the urgency of a spring 284 which is anchored with one end to the latch bar as at 286 and with its other end to a post 288 on the end plate 266. The pawl 280 is pivotally mounted on a post 290 on the end plate 266, and is normally urged into interlock with the notch 282 in the latch bar 256 by a spring 292 which is anchored with one end to the pawl 280 and with its other end to the post 288.

The notch 282 in the latch bar 256 and the pawl 280 are so coordinated that the latter will register with and partially enter the notch 282 just when the arm 270 of the lever 272 ceases to turn in counterclockwise direction on the release of the motor pinion 258 by the retracting latch bar 256, whereupon the pawl 280 will, under the urgency of its spring 292, fully enter the notch 282, and in doing so, further retract the latch bar 256 sufficiently to permit the motor drive of the pinion 258 without interference from the latch bar. The motor 252, through intermediation of the epicyclic train 294, will then drive the arm 254 clockwise toward and into its wound-up position (Fig. 15). During the clockwise motor-drive of the arm 254, the lever 272 will also be turned clockwise through intermediation of the gear segment 278 and pinion 276, and a pin 296 on the lever 272 will retract the pawl 280 from interlock with the notch 282 in the latch bar 256 and release the latter for spring-return into interlock with the motor pinion 258 when the arm 254 reaches its wound-up position.

It follows from the preceding that the continuously energized prime mover or motor 252 will be jammed during each spring-drive of the arm 254, and will be released for operation of each motor-drive of the same arm. It is, of course, fully within the purview of the present invention to apply the present motor-jamming principle to the clock drive of Figs. 11 and 12 in lieu of a switch or other instrumentality for controlling the operation of the prime mover or motor.

Figure 17:
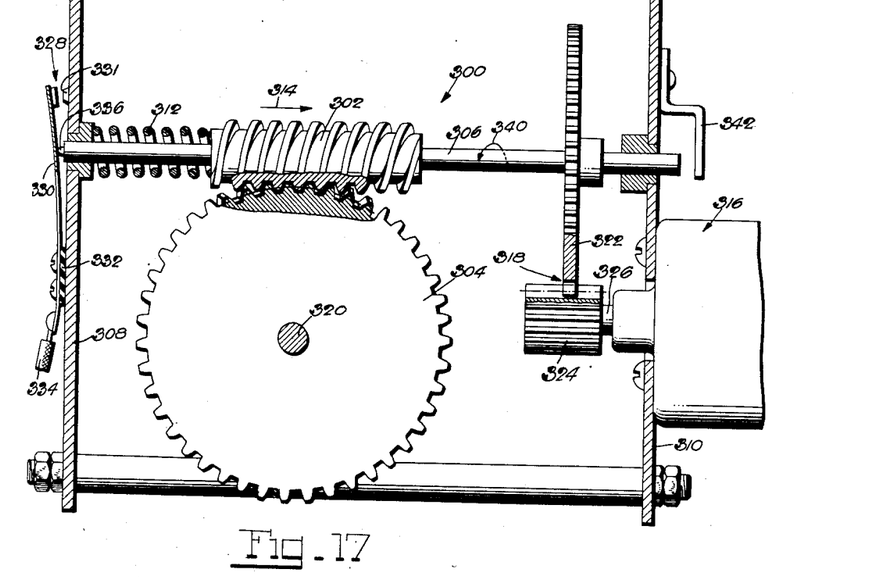
Fig. 17 is a fragmentary section through a constant torque drive embodying the present invention in still another modified manner.

Reference is now had to Fig. 17 which shows another modified constant torque drive 300 that differs from all previously described forms of the drive primarily by lacking an epicyclic train and providing a worm 302 and a worm gear 304 in lieu thereof. The worm 302 is, in the present instance, carried by a shaft 306 which extends between and is journalled and axially movable in pillar-spaced end plates 308 and 310. A compression-type spring 312, which surrounds the shaft 306 and is interposed between the end plate 308 and the worm 302, normally urges the shaft 306 and its worm 302 in the direction of the arrow 314 in which the worm, when not driven by the motor 316 through intermediation of reduction gearing 318, will drive the worm gear 304 on the suitably journalled output shaft 320 in clockwise direction. The reduction gearing 318 comprises in this instance the gears 322 and 324 which are carried by the shaft 306 and motor shaft 326, respectively.

For the control of the motor 316, there is provided a simple switch 328, comprising a conductive spring blade 330 and a contact point 331 on the grounded end plate 308. The contact blade 330 may insulatingly be mounted at 332 on the end plate 308, and connected by a lead 334 with one terminal of the motor 316 the other terminal of which may be connected with any suitable source of D. C. current, for instance. Hence, the motor circuit is closed when the contact blade 330 engages the contact point 331 on the end plate 308, and is opened when the contact blade is disengaged therefrom.

In Fig. 17, the worm 302 and its shaft 306 are shown in axial wound-up position in which the spring 312 is reloaded and the switch 328 is opened by engagement of an insulating tip 336 on the shaft 306 with the contact blade 330. Accordingly, the motor 316 is stopped and the reloaded spring 312 exerts itself to move the worm 302 and its shaft 306 in the direction of the arrow 314. Since the worm 302 is of the self-locking type and could not be turned by the worm gear 304 if the latter were driven, it follows that the worm 302 will, on its spring-urged motion in the direction of the arrow 314, not be turned and, hence, will drive the worm gear 304 at a peripheral speed which is equal to the axial speed of the worm. The torque developed in the output shaft 320 during the spring-drive of the worm 302 in the direction of the arrow 314 will be substantially constant and equal to the product of the force of the spring 312 and its effective radius arm on the output shaft.

As soon as the worm 302 and its shaft 306 have in their spring-drive reached run-down position, the switch 328 will be permitted to close and the motor 316 will be set in operation, driving thereby the worm in the direction of the arrow 340 to cause the latter to back up on the worm gear 304 counter to the direction of the arrow 314 and reload the partially unloaded spring 312 until the tip 336 on the shaft 306 again opens the switch 328 and permits the following spring-drive of the worm 302 and its shaft 306. However, the worm 302 will, during its motor drive into wound-up position, react with the worm gear 304 and continue the clockwise drive of the output shaft 320 at a substantially constant torque which is equal to the product of the force of the spring 312 and its effective radius arm on the output shaft, as will now be readily understood. Since the gear 322 is in this instance mounted on the axially movable shaft 306, the gear 324 is of sufficient length to remain in mesh with the gear 322 despite the axial shift of the latter with the shaft 306 within the axial operating range of the worm 302. A suitable stop 342 may be provided on the end plate 310 to limit axial motion of the shaft 306 under the urgency of the spring 312 so as to prevent demeshing of the worm and worm gear when the drive is idle.

It follows from the preceding that the present drive 300 will continuously drive the output shaft 320 in the same direction at substantially constant torque despite the alternating motor and spring drives of the worm 302. Accordingly, the present drive achieves the same objective as any of the previously described forms of the drive, though with a different structural arrangement.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A constant torque drive for a timing device, comprising two meshing gears; a timing arbor; a friction coupling connecting said arbor and one of said gears; an escapement drivingly connected with said one gear; means supporting the other gear for rotation about its axis and for bodily movement relative to said arbor without demeshing said gears; spring means urging said other gear bodily in a certain direction; means operative on movement of said other gear in said certain direction to restrain rotation of the latter in one direction so that the same will drive said one gear; and means for driving said other gear in the opposite direction.

2. A constant torque drive for a timing device, comprising two meshing gears; a timing arbor, a friction coupling connecting said arbor and one of said gears; an escapement drivingly connected with said one gear; a carrier on which the other gear is rotatably mounted, said carrier being rotatable about the axis of said shaft; a helical tension spring fixed at one end and anchored at its other end with said carrier for urging the latter in a certain direction; means operative on rotation of said carrier in said certain direction to restrain rotation of said other gear about its axis in one direction so that the same will drive said one gear; and means operative to drive said other gear in the opposite direction on rotation of said carrier into a certain position under the compulsion of said spring, said spring and carrier being so coordinated that the longitudinal axis of the spring and a straight line passing through its anchored end and the rotary axis of said carrier form substantially a right angle when said carrier is in said certain position.

3. A constant torque drive for a timing device, comprising two meshing gears; a timing arbor; a friction coupling connecting said arbor and one of said gears; an escapement drivingly connected with said one gear; a carrier on which the other gear is rotatably mounted, said carrier being movable relative to said arbor without demeshing said gears; a spring fixed at one end and connected at its other end with said carrier for urging the latter in a certain direction; means operative on movement of said carrier in said certain direction to restrain rotation of said other gear about its axis in one direction so that the same will drive said one gear; a prime mover for driving said other gear in the opposite direction; and control means operative on movement of said carrier through a predetermined range in said certain direction and in the opposite direction to render said prime mover operative and inoperative, respectively.

4. A constant torque drive for a timing device as set forth in claim 3, in which said prime mover is an electric motor, and said control means includes a switch for opening and closing the motor circuit and having a part carried by said carrier.

5. A constant torque drive for a timing device, comprising a timing arbor; a reduction-type epicyclic train having coaxial sun gears, a rotary arm and coaxial planetary gears rotatably carried by said arm and meshing with said sun gears, respectively; a friction coupling connecting said arbor and one of said sun gears; an escapement drivingly connected with said one sun gear; a spring fixed at one end and connected at its other end with said arm for urging the latter in a certain direction; means operative on rotation of said arm in said certain direction to lock the other sun gear against rotation in one direction and thereby cause said planetary gears to drive said one sun gear; and means operative on predetermined partial unloading of said spring to drive said other sun gear opposite to said one direction until said spring is reloaded to a predetermined extent.

6. A constant torque drive for a timing device, comprising a timing arbor; a reduction-type epicyclic train having coaxial sun gears, a rotary arm and coaxial planetary gears rotatably carried by said arm and meshing with said sun gears, respectively; a friction coupling connecting said arbor and one of said sun gears; an escapement drivingly connected with said one sun gear; a spring fixed at one end and connected at its other end with said arm for urging the latter in a certain direction; reduction gearing drivingly connected with the other sun gear and operative, when not driven, to lock the latter against rotation and thereby cause said planetary gears to drive said one sun gear when said arm rotates in said certain direction; and means operative on predetermined partial unloading of said spring to drive said reduction gearing so that said planetary gears will react with said one sun gear and turn said arm opposite to said certain direction until said spring is reloaded to a predetermined extent.

7. A constant torque drive for a timing device as set forth in claim 6, in which said driving means comprises an electric motor, and a switch having a fixed contact and another contact movable with said arm and cooperating with said fixed contact to close and open the motor circuit on rotation of said arm into positions corresponding to said partially unloaded and reloaded conditions, respectively, of said spring.

8. A constant torque drive for a timing device, comprising pillar-spaced end plates; a timing arbor extending between and journalled in said end plates; a reduction-type epicyclic train between said end plates having sun gears and an arm journalled on said arbor and coaxial planetary gears rotatably carried by said arm and meshing with said sun gears, respectively; a friction coupling connecting said arbor and one of said sun gears; an escapement between said end plates drivingly connected with said one sun gear; a spring anchored at one end to one of said end plates and connected at its other end with said arm for urging the latter in a certain direction; reduction gearing between said end plates drivingly connected with the other sun gear and operative, when not driven, to lock the latter against rotation and thereby cause said planetary gears to drive said one sun gear when said arm rotates in said certain direction; and means operative on predetermined partial unloading of said spring to drive said reduction gearing so that said planetary gears will react with said one sun gear and turn said arm opposite to said certain direction until said spring is reloaded to a predetermined extent.

References Cited in the file of this patent

UNITED STATES PATENTS

| | | |
|---|---|---|
| 1,370,047 | Rogers | Mar. 1, 1921 |
| 1,463,447 | Stahl | July 31, 1923 |
| 1,565,705 | Boner | Dec. 15, 1925 |
| 1,764,936 | Dean | June 17, 1930 |
| 1,864,348 | Given | June 21, 1932 |
| 2,317,490 | Simpson | Apr. 27, 1943 |
| 2,482,032 | Schweitzer | Sept. 13, 1949 |
| 2,513,217 | Tomlines | June 27, 1950 |